Aug. 4, 1970   L. L. RIZZO   3,522,641
JOINT ALIGNMENT DEVICE
Filed Oct. 9, 1968   2 Sheets-Sheet 1
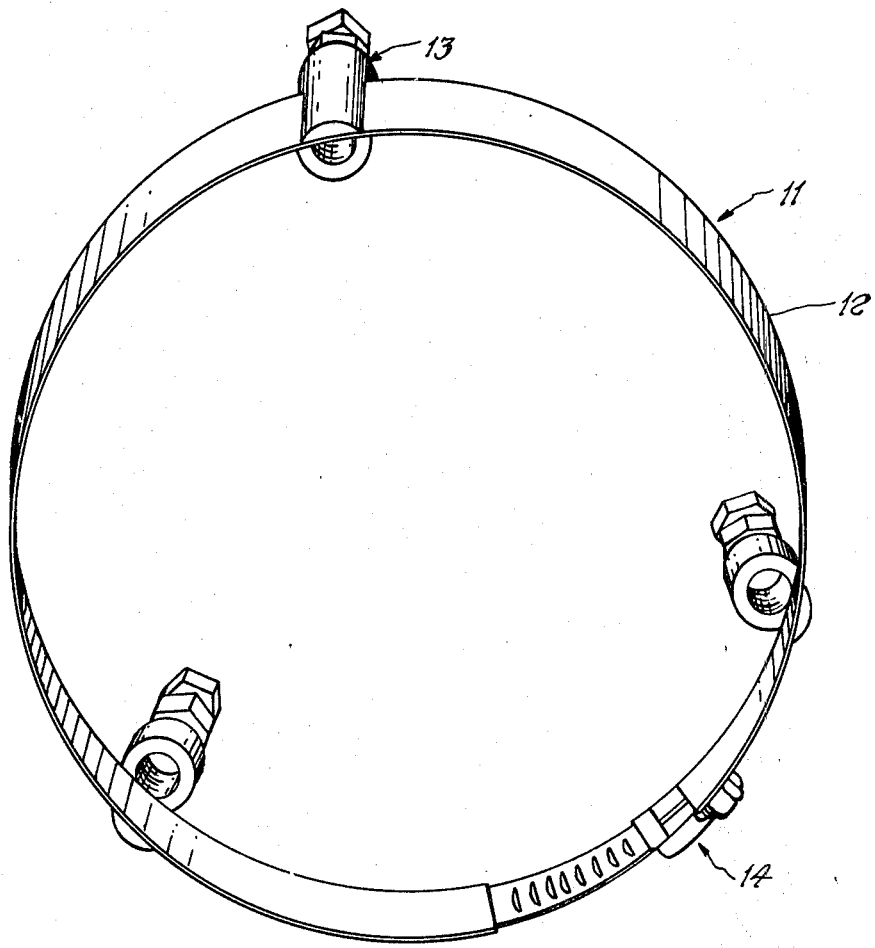
Fig. 1
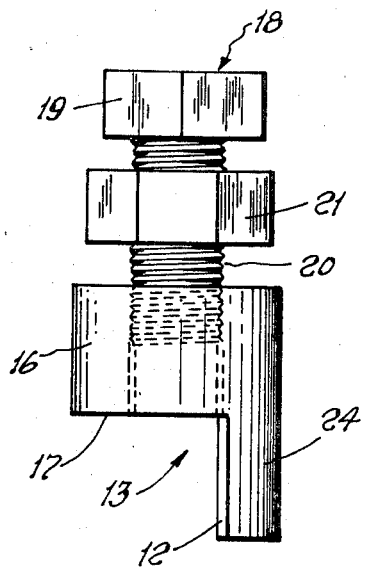
Fig. 2
INVENTOR.
LEO L. RIZZO

INVENTOR.
LEO L. RIZZO

United States Patent Office 3,522,641
Patented Aug. 4, 1970

3,522,641
JOINT ALIGNMENT DEVICE
Leo L. Rizzo, State Road, York, Maine 03909
Filed Oct. 9, 1968, Ser. No. 766,072
Int. Cl. B65d 63/00
U.S. Cl. 24—281                                    9 Claims

ABSTRACT OF THE DISCLOSURE

The disclosure relates to an alignment device which effectively locks the joint of standard flexible connections in the neutral position during storage, handling and installation thereby precluding misalignment during installation.

---

The invention described herein may be manufactured and used by or for the Government of the United States of America for governmental purposes without the payment of any royalties thereon or therefor.

This invention relates to an alignment device and, more particularly, to a spacing and alignment means for maintaining a flexible connection in alignment during installation.

In the area of ship construction, particularly submarine construction, there are many high pressure lines which must maintain a sealed condition under the most severe conditions. Such a seal is seriously affected by misalignment during installation of sections of the line when joined to a flexible connection. Where a pipe section which is to be connected is not in precise alignment with the connecting means, strain and leakage problems arise which are easily aggravated during operating conditions. Frequently, a flexible connection is installed in a cocked position because the connecting piping is slightly out of line at the time of connection. Under other circumstances, the connecting piping or equipment may drift on isolation mounts thereby causing misalignment. Whatever the cause, a misaligned flexible joint will often leak and, at the minimum, represents a possible source of damage and danger to the vessel and its personnel.

When misaligned joints exist, subsequent correction usually cannot be accomplished at sea and, therefore, another inport availability is required for the vessel during which the systems must be opened, repiped or the joints replaced—all of which are expensive and time-consuming.

Several types of alignment devices have been tried in the past to assure effective connection with flexible pipe connectors. Of these, the Dutchman type, which includes two opposed collars having axially extending ridges on the internal surface thereof, has been tried without success. A saddle type jig, which comprises a pair of supports connected to at least one of the piping sections to be joined, also has not proven to be successful due to the fact that studs are required which prevent the bolts securing the pipe to the upright from being installed and also are extremely difficult in removal. Often the bolts may be removed with a hacksaw, but in some cases the bolts are actually inaccessible.

The lack of success of prior devices in assuring alignment led to the conception of the present invention which invention avoids the disadvantages of the prior devices and provides an adjustable alignment jig for locking the joint in a neutral position by the insertion of a spacer between the movable components. The locking joint obtained through this invention becomes, in effect, a short piece of rigid pipe, the joint being prevented from absorbing misalignment during installation and being easily removed with a standard open-end wrench and a screwdriver.

Accordingly, it is an object of the present invention to provide a simple device for effectively locking in position a flexible connector to which pipe sections are to be connected.

Another object of the present invention is to provide an alignment device which is both simple to install and easy to remove in a variety of compact or ordinarily inaccessible spaces.

A further object of this invention is to provide an alignment device which is simple and inexpensive and which insures that the connecting piping is precisely and firmly aligned so as to assure a substantially perfect connection.

Other objects, advantages and novel features of the invention will become apparent from the following detailed description thereof when considered in conjunction with the accompanying drawings in which like numerals represent like parts throughout and wherein:

FIG. 1 is an isometric view of the alignment device of the present invention assembled in the form in which it is installed;

FIG. 2 is an enlarged view of a component of the device of FIG. 1;

Figure 3:
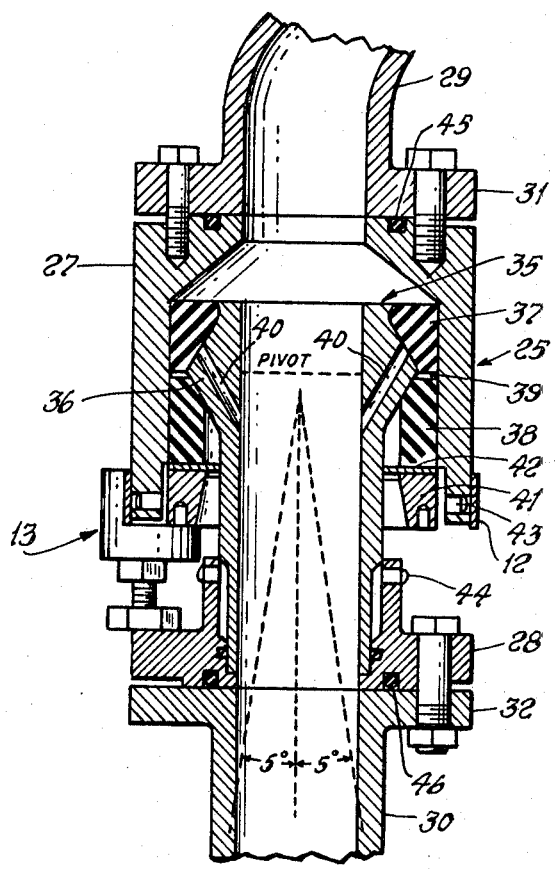
FIG. 3 is a sectional view of the alignment device of the present invention installed in a flexible connection.

Referring now to FIG. 1, there is shown an alignment device 11 which includes a band or hose clamp 12 having secured thereto a plurality of spacer means 13 and an adjustable tightening means 14. Bend 12 and tightening means 14 may be made in a manner in which standard hose clamps are constructed, the distinction here being primarily in the enlarged length of the hose clamp band. Affixed to the hose clamp band, preferably in symmetrical arrangement, are the spacing means 13 which, as seen in greater detail in FIG. 2, include a boss 16 which is cut away as indicated at 17 to permit installation of the device, a bolt 18 having head 19 and a threaded shaft 20. A locked nut 21 inserted between the bolthead 19 and boss 16 completes the components of the spacer means. Spacer means 13 are secured to band 12 preferably by spot welding, not shown, centrally with respect to the noncutaway section 24 of each boss. Section 24 may be made in a variety of lengths but preferably has a length equal to the width of band 12.

Figure 4:
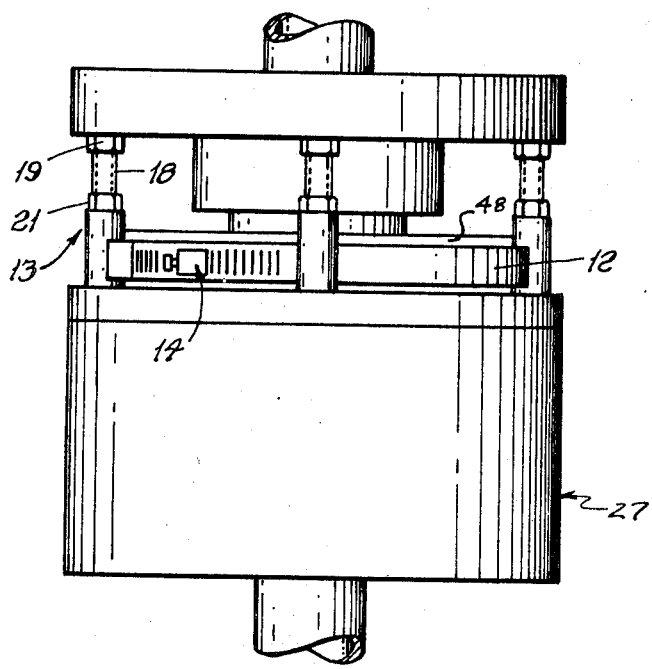
FIG. 4 is an elevational view of the present alignment device installed in a flexible connection.

In FIG. 3, the embodiment of FIG. 1 is shown secured to the one of two spaced components of a commercially available, flexible connection 25. Although the inventive concept is adaptable to a variety of flexible connections, it will be described only with respect to that shown. The flexible connection 25 is provided with a body 27 to which one of the pipe sections to be connected is secured and a flange 28 to which the other pipe section is secured. The pipe sections being joined are shown at 29 and 30 and preferably are welded to respective connecting flanges 31 and 32. The internal components of the flexible connection illustrated include a metallic nipple 35 which is provided with a circumferential ridge 36 about which are disposed a pair of rubber isolation sections 37 and 38. These isolation sections are spaced apart as indicated at 39. Nipple 35 is provided with a passage 40 and is secured in place within body 27 by a nut 41 which is spaced from the adjacent rubber isolation section 38 by a washer 42. Nut 41 is secured in position by setscrews 43 and flange 28 is secured in position by setscrews 44. A seal is maintained between flange 31 and body 27 by an O ring 45 and between flange 28 and flange 32 by an O ring 46. A circumferential space exists between nut 41 and flange 28. After installation, the longitudinal axis of flange 28 is permitted to pivot omnidirectionally about five degrees with respect to the axis of body 27. FIG. 4 shows the alignment device installed in a different form of flexible connection from that of FIG. 3. Four spacer means 13 are provided in the device in this figure, and band 12 is secured about an exterior surface 48 so that the entire surface of bolt heads 19 bears against the adjacent flange.

In operation, the spacer of the present invention is securely aligned with respect to the axis of the body 27 by affixing band 12 about the periphery of body 27 adjacent the space between body 27 and flange 28. After band 12 is affixed and aligned precisely with body 27 and is disposed with surface 17 adjacent the corresponding surface of body 27, nut 19 on each of the securing means is backed out to the point of contact with the adjacent surface of flange 28. Thereafter, each of the nuts 19 is backed securely against the adjacent surface of flange 28 and locking nuts 21 are tightened in place to prevent further movement of bolts 18. In this condition, flange 28 is securely positioned with respect to body 27 so that no anticipated force applied to flange 28 while attaching flange 32 thereto will be transmitted to and cause misalignment of the flexible connection. Pipe 29 preferably is secured to body 27 by securing flange 31 to the body by bolts, not shown, before positioning alignment device 11 as indicated above. It will be appreciated, however, that the desired installation can also be achieved by mounting alignment device 11 ond body 27 before either pipe connection is secured thereto.

Upon both pipe sections being secured to the flexible connection, the securing means is removed quickly and simply by unlocking locking nuts 21 and releasing the pressure on bolts 28, then removing band 12 from the periphery of body 27 by backing the perforate end out of engagement with the worm gear if necessary. This removal may be accomplished with ease despite almost any conceivable close or confined area in which the flexible connection may be located. As to rigidity, it has been determined that alignment is effectively maintained in a flexible connection to which the pipe sections have been attached under a weight applied perpendicular to the longitudinal axis of one section in an amount on the order of 230 or more pounds.

The spacing means of the present invention uses simple and inexpensive components, may be reused indefinitely and requires no special skill or training to use. The number of spacers disposed about band 12 may be varied depending upon the application. In the embodiments illustrated, only three or four spacers are shown; however, it may be appreciated that five, six or even more spacers may be employed without appreciably affecting installation and removal. In disposing the spacer means 13 with respect to flanges 31 and 32 in FIG. 3, it should be noted that boltheads 19 should be positioned sufficiently clear of the boltholes in those flanges so that the bolts will not be positioned opposite openings such as boltholes in the flanges.

The present invention uses standard hose clamp means for adjusting the periphery of band 11. Such means are entirely adequate to apply a holding force during the positioning of boltheads 18 against flange 28. When installed, the invention locks the flexible joint in a neutral position. The locked joint then becomes, in effect, a short piece of rigid pipe which is positively prevented from being misaligned during installation. The invention thus insures that the connecting pipe must be aligned perfectly during the installation process.

Obviously many modifications and variations of the present invention are possible in the light of the above teachings. It is therefore to be understood that within the scope of the appended claims the invention may be practiced otherwise than as specifically described.

What is claimed is:

1. A device for maintaining the alignment of flexible connecting means during attachment of the members to be connected thereto comprising:
   means adapted for peripheral attachment to one component of said connecting means,
      said means adjustable and removable and including adjustable spacers secured thereto,
         said spacers disposed substantially symmetrically along said means and adapted for extension transverse to the longitudinal axis of said means; and
   locking means associated with said spacers for securing said spacers in a selected position so that said means may be easily and rapidly assembled about the periphery of a flexible connecting means, the spacers thereon may then be extended into engagement with opposed surfaces on the flexible connecting means and the spacers may be locked into position so as to maintain precise alignment of selected components of said flexible connecting means during installation of members to be attached thereto.

2. The device of claim 1 wherein said means is peripherally attached by a flexible band disposed about said one component,
   said band being discontinuous and adapted for closing and opening by connecting means disposed at the ends thereof.

3. The device of claim 2 wherein said spacers are secured to one surface of said band,
   the other surface of said band being substantially continuous so as to permit close conformation thereof to said connecting means.

4. The device of claim 3 wherein each of said spacers includes a boss to which said band is secured and extendable means associated therewith,
   said extendable means adapted to be moved into abutment with one surface of said flexible connecting means;
   a parallel, remote surface of said boss adapted to abut against another surface of said flexible connecting means opposite said one surface,
      said one surface and said remote surface being on separate components of said flexible connecting means so that the extension of said spacer means into abutment with said surfaces will operate to maintain said components firmly in alignment during installation of said flexible connecting means.

5. The device of claim 4 wherein said extendable means is a bolt and said boss is centrally tapped to receive said bolt,
   said locking means being a nut positioned on said bolt abutting the surface of said boss remote from said band when in the locking position.

6. A device for maintaining alignment between interconnected components of a flexible type connection adapted for exterior rigidification comprising:
   a plurality of adjustable spacer means substantially evenly disposed about the periphery of said flexible type connection,
      said spacer means at least partially accommodated between opposed surface on said interconnected components;
      said spacer means adapted to be opened into forcing abutment against said surfaces and to be locked in such condition so that said components are restrained from movement with respect to one another; and
   means connected to said spacer means and adapted to be fastened about at least one of said components for positioning said spacer means and maintaining such means in position during installation of said flexible type connections.

7. The device of claim 6 wherein said spacer means includes a boss having a depending portion adapted to conform to a peripheral portion of said one of said components and an extendable insert adapted to be moved into abutment against one of said surfaces.

8. The device of claim 7 wherein said extendable insert is a bolt and said boss is tapped to receive said bolt,
the head of said bolt abutting against one of said surfaces, said boss having a surface remote from and parallel to the abutting surface of said bolt,
said remote surface abutting against the other of said surfaces.

9. The device of claim 8 wherein said means connected to said spacer means is a flexible band adapted to be disposed about one of said components,
said band being discontinuous and adapted for closing and opening by connecting means disposed at the ends thereof.

References Cited

UNITED STATES PATENTS

| | | | |
|---|---|---|---|
| 2,462,504 | 2/1949 | Kass | 24—281 |
| 3,144,261 | 8/1964 | Stephens | 285—114 |
| 3,356,390 | 12/1967 | Dahlgren et al. | 285—81 X |

FOREIGN PATENTS

| | | |
|---|---|---|
| 654,470 | 10/1964 | Belgium. |
| 1,006,684 | 4/1957 | Germany. |
| 1,159,301 | 12/1963 | Germany. |

J. KARL BELL, Primary Examiner

U.S. Cl. X.R.

285—81, 114